(12) United States Patent
Mulhern

(10) Patent No.: US 9,316,351 B2
(45) Date of Patent: *Apr. 19, 2016

(54) CRADLE APPARATUS AND METHOD FOR ROTATING AND LINEARLY DISPLACING AN ELECTRONIC DEVICE

(71) Applicant: Iordanka Koleva Mulhern, Milwaukee, WI (US)

(72) Inventor: Iordanka Koleva Mulhern, Milwaukee, WI (US)

(73) Assignee: WORLD RICHMAN MANUFACTURING CORPORATION, Elgin, IL (US)

( * ) Notice: Subject to any disclaimer, the term of this patent is extended or adjusted under 35 U.S.C. 154(b) by 0 days.

This patent is subject to a terminal disclaimer.

(21) Appl. No.: 14/676,960

(22) Filed: Apr. 2, 2015

(65) Prior Publication Data

US 2015/0240990 A1  Aug. 27, 2015

Related U.S. Application Data

(62) Division of application No. 14/186,653, filed on Feb. 21, 2014, now Pat. No. 9,080,716.

(51) Int. Cl.
| | |
|---|---|
| *F16M 11/10* | (2006.01) |
| *F16M 13/02* | (2006.01) |
| *F16M 11/04* | (2006.01) |
| *F16M 11/08* | (2006.01) |
| *F16M 11/22* | (2006.01) |
| *F16M 13/00* | (2006.01) |
| *F16M 11/06* | (2006.01) |

(52) U.S. Cl.
CPC ............ *F16M 13/022* (2013.01); *F16M 11/041* (2013.01); *F16M 11/043* (2013.01); *F16M 11/046* (2013.01); *F16M 11/06* (2013.01); *F16M 11/08* (2013.01); *F16M 11/22* (2013.01); *F16M 13/00* (2013.01)

(58) Field of Classification Search
CPC ... F16M 11/04; F16M 11/043; F16M 13/022; F16M 11/06; F16M 11/045; F16M 11/046; F16M 11/048; F16M 11/061; F16M 11/041; F16M 11/105; F16M 11/2021; H05K 7/1401; A47B 23/04; A45C 2011/003

See application file for complete search history.

(56) References Cited

U.S. PATENT DOCUMENTS

| | | | | |
|---|---|---|---|---|
| 261,740 | A * | 7/1882 | El Marucheau | 248/490 |
| 7,246,956 | B2 * | 7/2007 | Pernstich et al. | 396/428 |
| 7,966,757 | B2 * | 6/2011 | Hyung-Chul | 40/603 |
| 8,230,992 | B2 * | 7/2012 | Law et al. | 206/320 |
| 8,413,943 | B1 * | 4/2013 | Li | 248/454 |

(Continued)

*Primary Examiner* — Nkeisha Smith
(74) *Attorney, Agent, or Firm* — Christopher J. Scott

(57) ABSTRACT

A case construction encases an electronic device and enables a user to rotatably and linearly displace the electronic device relative to a select surface of the case construction. The case construction includes a case with a cradle-receiving surface, a cradle sized and shaped to removably receive an electronic device, and a device-to-surface anchor assembly. The cradle includes a centralized region having an oblong aperture and adjustable arm assemblies. The oblong aperture defines a cradle displacement zone segment. The device-to-surface anchor assembly secures the cradle device to the cradle-receiving surface and is cooperable with the oblong aperture for enabling a user to linearly and rotatably displace the centralized region along the cradle displacement zone segment. Certain methodology for displacing an electronic device relative to select surfacing so as to position the electronic device in a select orientation relative to the select surfacing is further provided.

12 Claims, 16 Drawing Sheets

(56) References Cited

U.S. PATENT DOCUMENTS

| | | | |
|---|---|---|---|
| 8,424,825 B2* | 4/2013 | Somuah | 248/316.4 |
| 8,851,751 B2* | 10/2014 | Kobayashi | 378/189 |
| 2006/0187696 A1 | 8/2006 | Lanni | |
| 2008/0002369 A1 | 1/2008 | Carnaveli | |
| 2011/0261509 A1 | 10/2011 | Xu | |
| 2012/0074272 A1* | 3/2012 | Hull | 248/122.1 |
| 2012/0075789 A1* | 3/2012 | DeCamp et al. | 361/679.26 |
| 2012/0246879 A1* | 10/2012 | Pestal et al. | 24/3.2 |
| 2013/0009032 A1* | 1/2013 | Polletta et al. | 248/440.1 |
| 2013/0026324 A1* | 1/2013 | Fischer et al. | 248/316.1 |
| 2013/0206942 A1* | 8/2013 | Trotsky | 248/274.1 |
| 2014/0014790 A1* | 1/2014 | White et al. | 248/122.1 |
| 2014/0130334 A1* | 5/2014 | Chun | 29/525.01 |
| 2014/0328020 A1* | 11/2014 | Galant | 361/679.56 |
| 2014/0361130 A1* | 12/2014 | Fenton | 248/176.1 |
| 2014/0376182 A1* | 12/2014 | Motoishi et al. | 361/679.55 |

\* cited by examiner

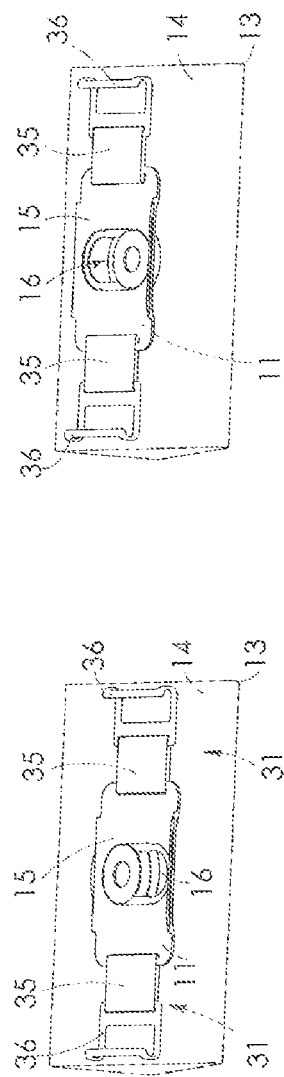
FIG. 3
FIG. 4
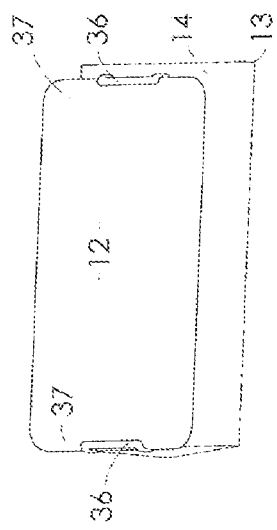
FIG. 5
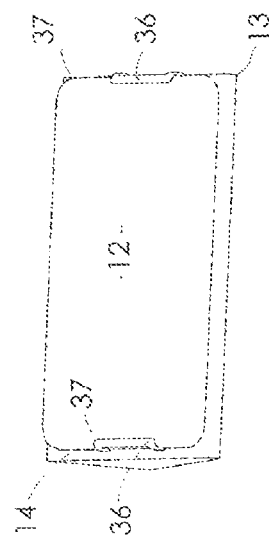
FIG. 6

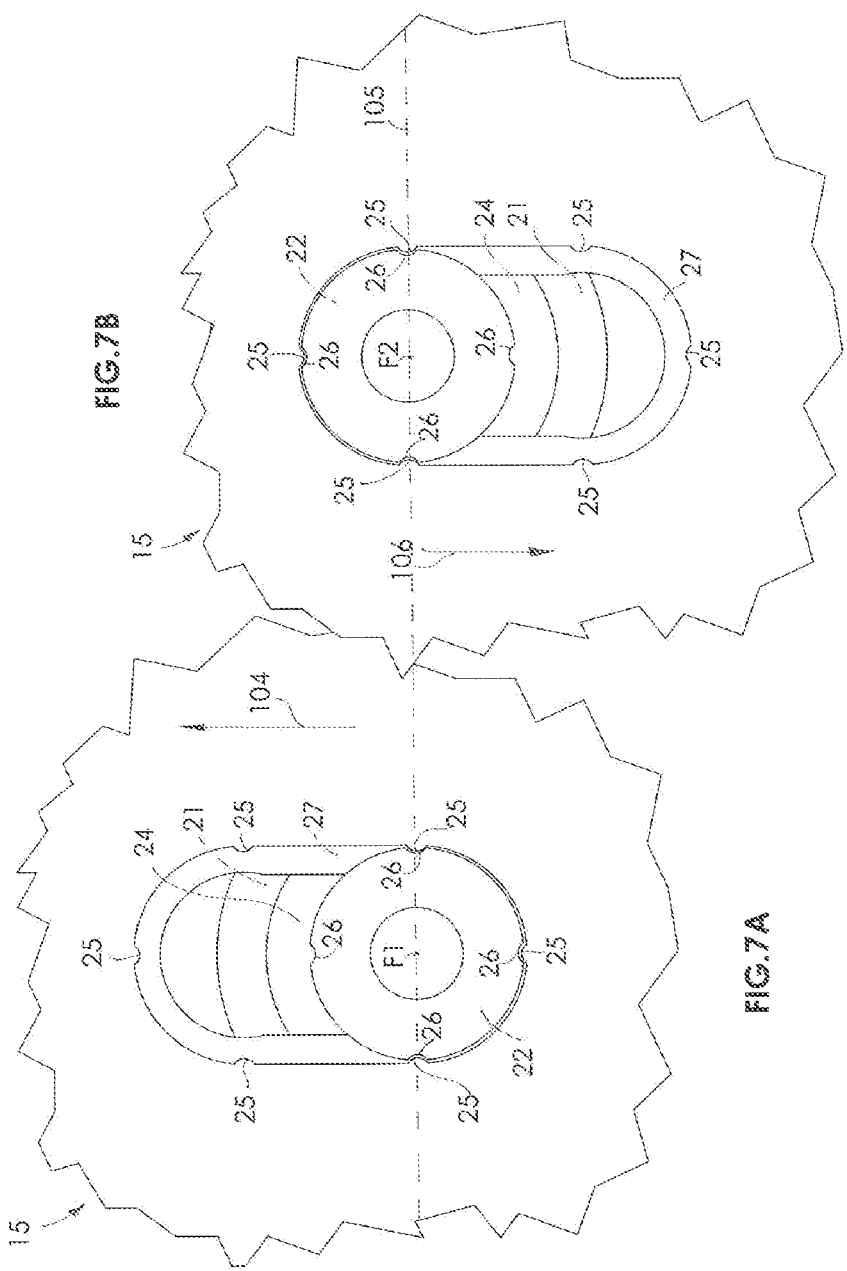

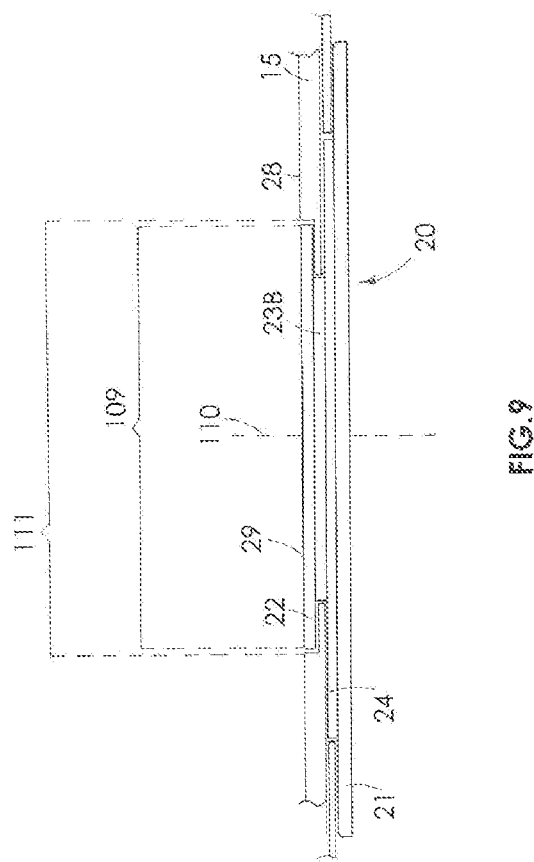

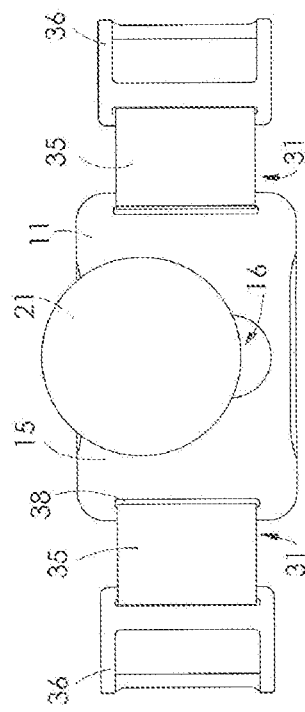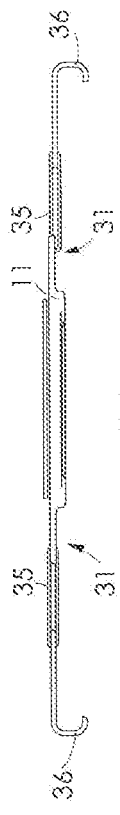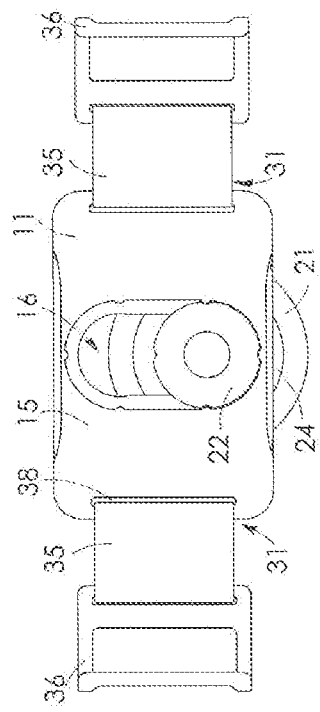

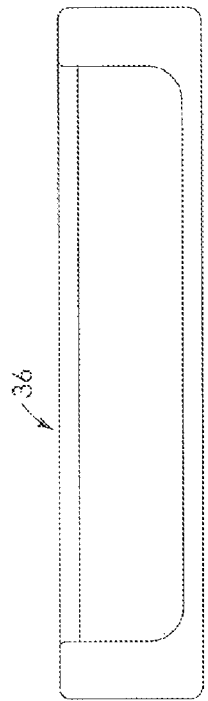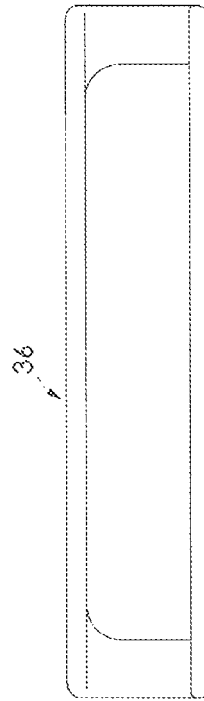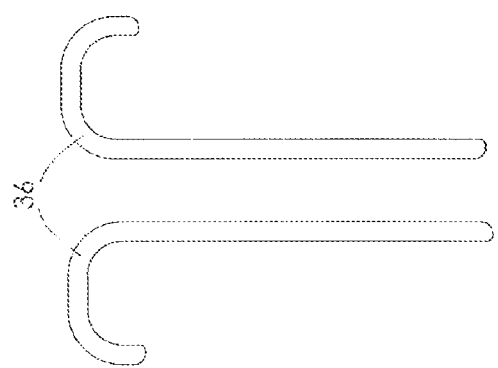

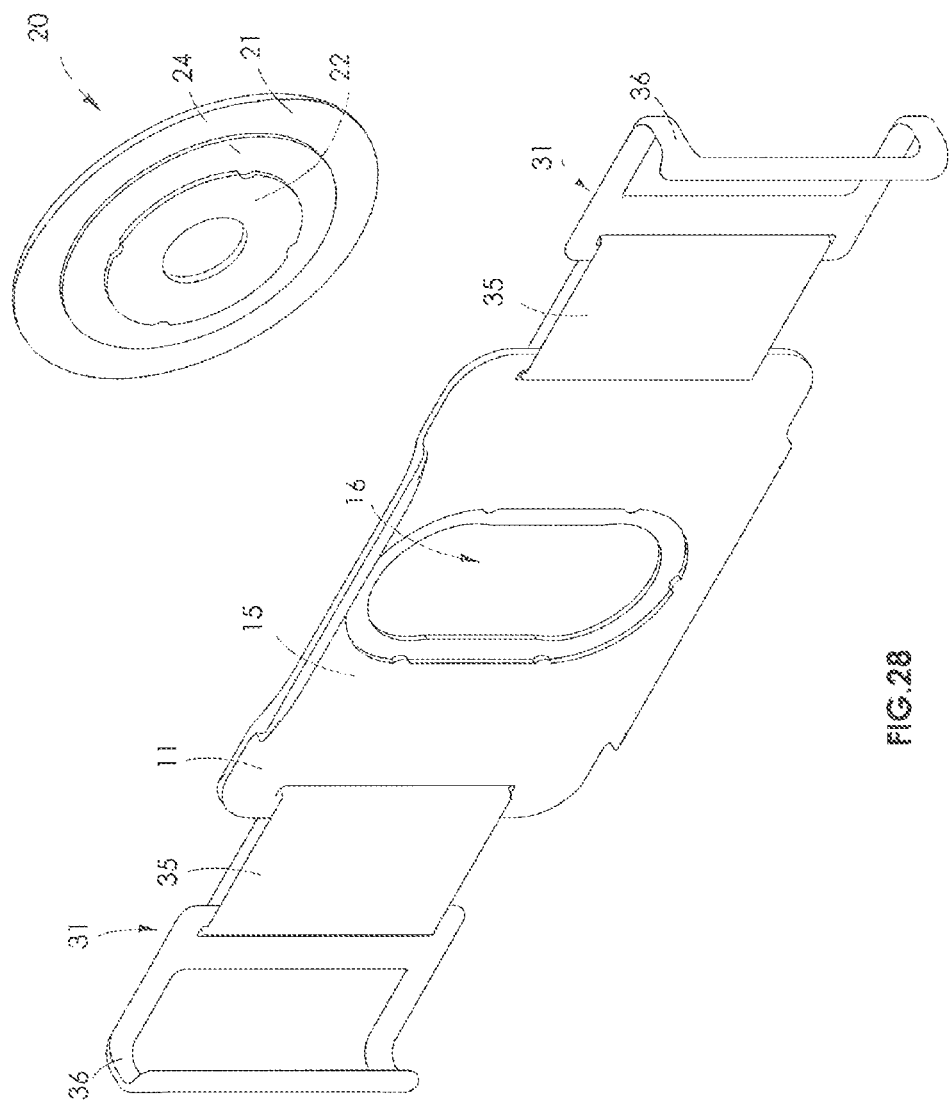

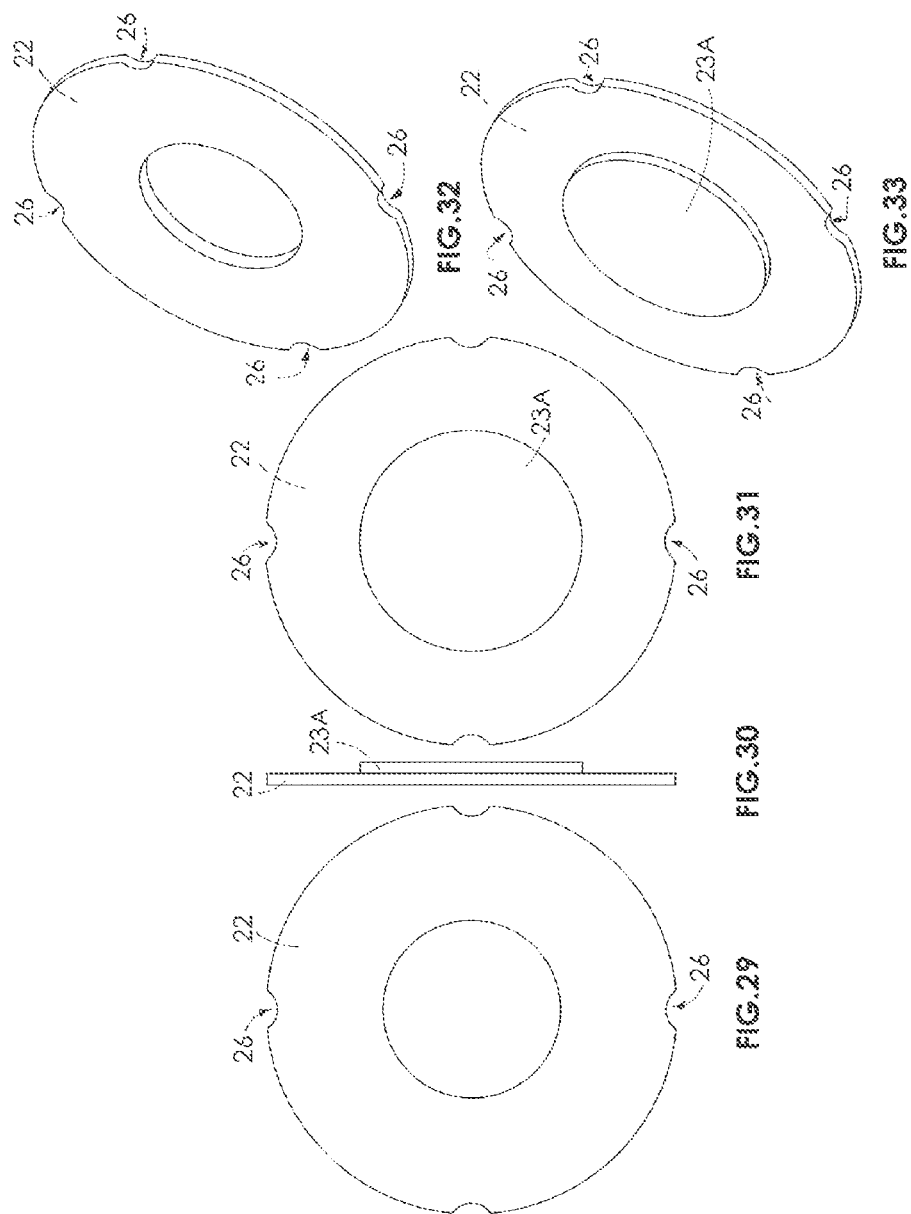

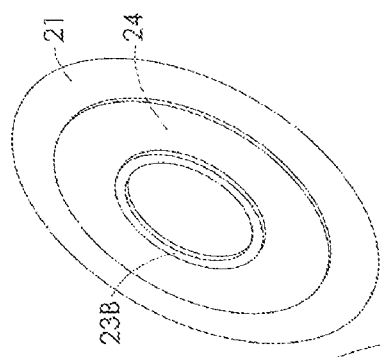
FIG.37
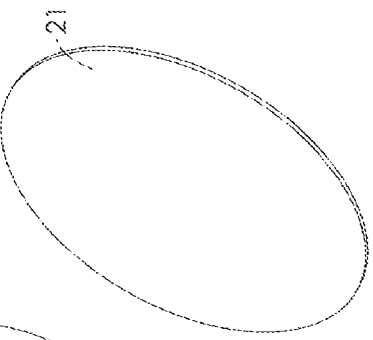
FIG.38
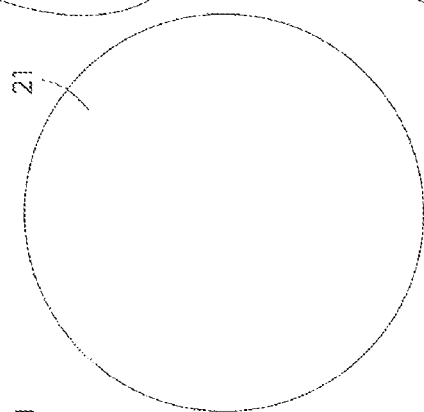
FIG.36
FIG.35
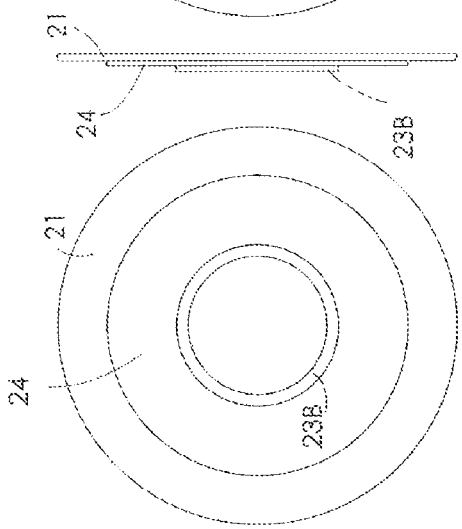
FIG.34

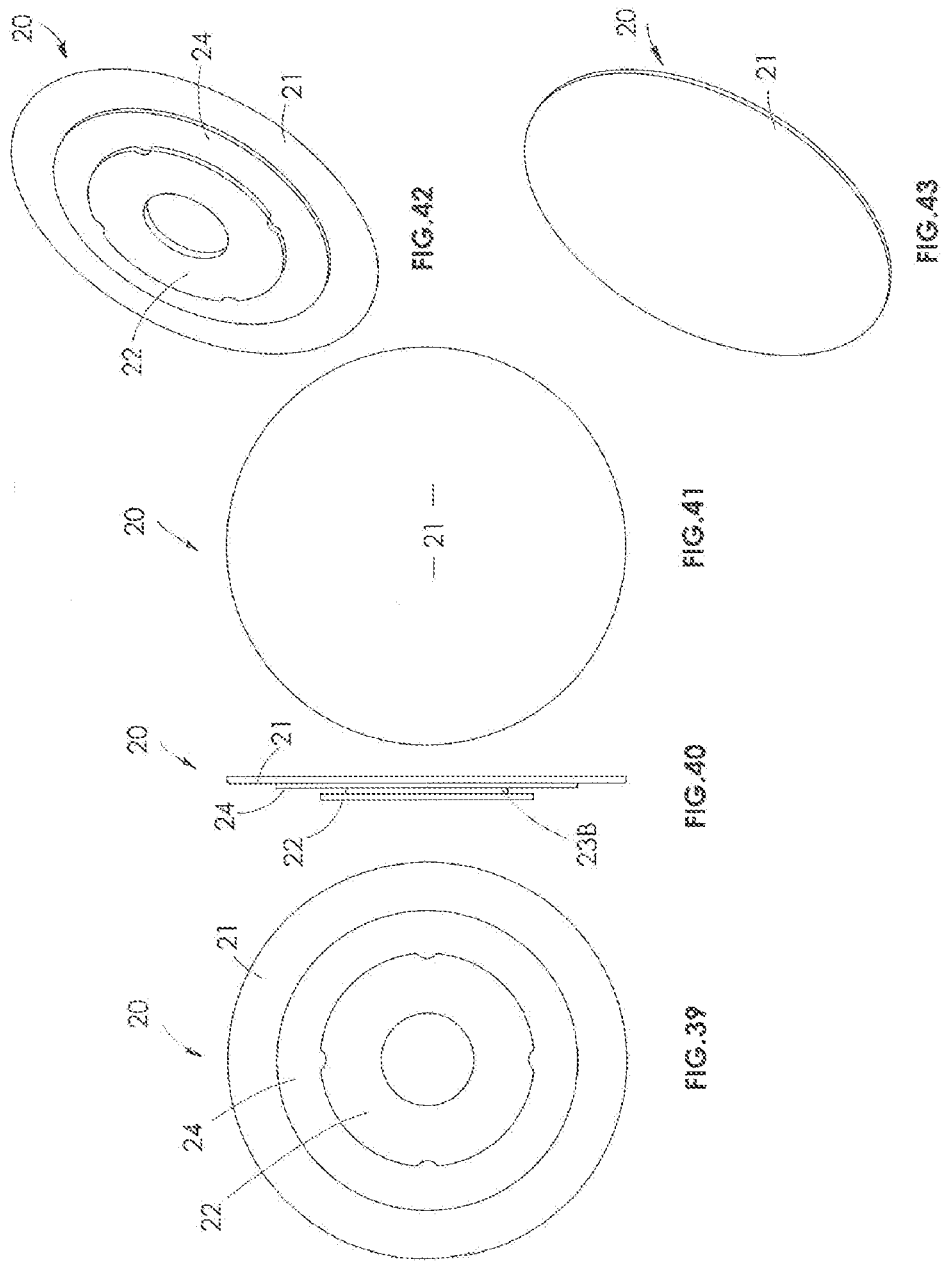

CRADLE APPARATUS AND METHOD FOR ROTATING AND LINEARLY DISPLACING AN ELECTRONIC DEVICE

PRIOR HISTORY

This application is a divisional patent application claiming the benefit of or divided from pending U.S. patent application Ser. No. 14/186,653 ('653 application) filed in the United States Patent and Trademark Office (USPTO) on 21 Feb. 2014, which application is a Continuation-in-Part type patent application originally claiming the benefit of International Patent Application No. PCT/US2012/000204, filed in the USPTO on 16 Apr. 2012; International Patent Application No. PCT/US2012/000229, filed in the USPTO on 1 May 2012; and related to U.S. Design patent application Ser. No. 29/464,386, filed in the USPTO on 15 Aug. 2013. The specifications of the '653 application are hereby incorporated by reference thereto.

BACKGROUND OF THE INVENTION

1. Field of the Invention

The disclosed invention generally relates to a case-like construction for receiving and positioning an electronic device such as a laptop type computer or tablet. More particularly, the disclosed invention provides a case-based apparatus for enabling a user to selectively rotate and/or linearly displace an attached electronic device relative to a fixed basal structure defined by a case-like construction.

2. Brief Description of the Prior Art

Case constructions for use in combination with electronic devices such as tablet type computers and the like are well known in this field of art. While the basic function of a basic case construction is to protect and/or enclose the device it encases, the art continues to develop with an eye toward enhancing functionality of the case constructions so as to provide the user with various means of manipulating and/or re-positioning the devices.

For example, it may be desirable to rotate and/or linearly displace the electronic device for different views or positions, while generally supporting the device within or as attached to the basal case construction. When the tablet computer or similar device is supported in its carrying case during use thereof, the multi-function use of the case provides great advantages for utility thereof, while keeping a structure for the improved use to a minimum.

It is further noted that tablet type computers and the like are manufactured in a variety of sizes and shapes. Accordingly, it is beneficial for a computer mounting device to adjust to the size and/or contours of the respective device(s), while still providing the desired holding and re-positioning capabilities. A few of the more pertinent prior art patent-related disclosures relating to cradle-like devices for holding and enabling the re-positioning of the devices they hold are described hereinafter.

U.S. Pat. No. 5,708,561 ('561 patent), issued to Huigol et al., discloses a Portable Computer Having Display Slidably and Rotatably Mounted for Movement between Landscape and Portrait Orientation and to Open and Close Speaker Ports. The '561 patent describes a portable computer includes a base and a cover incorporating a display screen pivotably mounted to the base between a closed position overlying the base and an open position raised over the base. A swivel arrangement is located in the cover enabling at a least a portion of the cover and the display screen to be rotatable about an axis which is perpendicular to the cover in the open position, and between a landscape orientation in which the display screen has a longer dimension extending in a substantially horizontal direction and a portrait orientation in which the display screen has a shorter dimension extending in a substantially horizontal direction. The cover is also mounted for sliding movement. Front speaker ports are opened and closed when the cover moves. A recessed corner segment is provided on the cover for easier manipulation of the cover.

U.S. Pat. No. 8,230,992 ('992 patent), issued to Law et al, discloses a Tablet Computer Case for Multiple Viewing Orientations. The '992 patent describes a case or cover for an electronic device such as a tablet computer is disclosed. This case allows the user to protect and personalize their tablet computer. The case allows the user to position the device for viewing in either portrait or landscape mode and does not require the user to hold the device in the desired orientation. The case may have a distinct hinge, with a stop that limits its rotational travel allowing the user to prop the electronic device up, at a desired viewing angle.

United States Patent Application Publication No. 2006/0187696 ('696 Publication), authored by Lanni, discloses a Cradle for Receiving an Adapter. The '696 Publication describes a cradle casing having a DC/DC adapter to receive DC power from a DC power source and generate a first DC power signal. A sleeve accepts an AC/DC adapter, and guides movement of the AC/DC adapter when the AC/DC adapter is inserted into the cradle casing. The AC/DC adapter is capable of receiving AC power from an AC power source and generating a second DC power signal. A circuit receives at least one of the first DC power signal and the second DC power signal and outputs a third DC power signal.

United States Patent Application Publication No. 2008/0002369 ('369 Publication), authored by Carnevali, discloses a Portable Device Docking Station. The '369 Publication describes an external expanding apparatus or "docking station" operable with a portable computer device of a type having a display unit having a display screen on an inner surface thereof and a hard shell backing surface opposite thereof and pivotally mounted on a substantially rigid casing having a pair of locating holes adjacent to opposite corners of a substantially planar bottom surface thereof, and an input/output (I/O) connector positioned on a back plane thereof with a pair of positioning apertures provided on opposite sides thereof.

United States Patent Application Publication No. 2011/0261509 ('509 Publication), authored by Xu et al., discloses a Docking Cradle with Floating Connector Assembly. The '509 Publication describes a docking cradle for a portable electronic device that includes a floating connector assembly. The floating connector assembly isolates a portable electronic device connected to the connector assembly from at least some of the shock, vibration or other motion imposed on the rest of the docking cradle.

The connector assembly is positioned above a base frame and comprises a platform, a device interface on the platform, a device securing mechanism connected to the platform and connectable to the portable electronic device to physically secure the portable electronic device to the connector assembly; and at least one connector assembly spring connecting the connector assembly to the base frame such that the connector assembly is movable laterally relative to the base frame.

United States Patent Application Publication No. 2012/0075789 ('789 Publication), authored by DeCamp et al., discloses a Swiveling Base for a Portable Computing Device. The '789 Publication describes certain swiveling bases for portable computing devices. A swiveling base according to the '789 Publication includes a base member and a rotatable member. The base member can be placed on a flat surface and rotatably supports the rotatable member. The rotatable member releasably secures the portable computing device and can rotate relative to the base member to reorient a display of the portable computing device.

The swiveling bases may further include a control component disposed on the base member. The control component is disposed on the base member and facilitates user interaction with a computing application being executed on the portable computing device. The control component may be, for example, a button, a joystick, a D-pad, a tactile sensor pad, a touch-sensitive D-pad, a spherical trackball, a slider, or a sliding disk.

From a review of the foregoing citations in particular, and from a consideration of the prior art in general, it will be seen that the prior art thus perceives a need for a cradle apparatus usable in combination with a case or cover construction for enabling a user to removably receive an electronic device as exemplified by a tablet type computer and rotatably and linearly displace the cradle apparatus relative to select surfacing of the case or cover construction to which the cradle apparatus is attached as summarized in more detail hereinafter.

SUMMARY OF THE INVENTION

Among the many objectives of this invention is the provision of a mechanism for a computer or similar device, which cooperates with a carrying case for the computer or similar device. A further objective of this invention is the provision of a mechanism for a computer or similar device, which facilitates rotation and linear movement of the computer or similar device relative to surfacing of the case or cover construction to which the mechanism is attached. Yet a further objective of this invention is the provision of a mechanism for a computer or similar device, which facilitates mounting of the computer or similar device to the case.

These and other readily identifiable objectives of the invention (which other objectives become clear by consideration of the specification, claims and drawings as a whole) are met by providing a cradle apparatus for a computer or similar device which cooperates with a case for the computer or similar device and allows the computer or similar device to be placed in a variety of positions relative to the case.

To achieve these and other readily identifiable objectives, the present invention contemplates a case or cover construction having a cradle mechanism cooperatively associated therewith. The case or cover construction is designed to encase an electronic device such as a tablet computer as received and cradled by the cradle mechanism. The cradle mechanism enables the user to rotate and linearly displace the cradled electronic device relative to certain surfacing of the case or cover construction.

Electronic devices such as tablet computers very often comprise features that require the user to position the electronic device, which features may be obscured by the case or cover construction in which they are housed. To overcome this perceived need in the art, the present invention provides a cradle mechanism that enables selective displacement of the target electronic device relative to certain surfacing of the case or cover construction so that users may make more effective use of the electronic device while protecting the electronic device with the case or cover construction that incorporates the cradle mechanism according to the present invention.

When received or cradled by the cradle mechanism according to the present invention, the electronic device may be rotated to achieve a different view of the screen, such as alternatively a portrait type orientation or a landscape orientation. The cradle mechanism and/or case or cover construction according to the present invention enables the user to remove the electronic device from the cradle mechanism and/or case or cover construction in which it is housed when desired.

The cradle apparatus, mechanism or device according to the present invention basically provides a mechanism for simultaneously rotatably and linearly displacing an electronic device as cradled by the mechanism adjacent surfacing of a case or cover construction. To achieve this primary function, the cradle mechanism or device according to the present invention preferably comprises a cradle construction sized and shaped to removably receive an electronic device as typified by a tablet type computer.

Each of the cradles or cradle constructions according to the present invention comprises a flat centralized region. The centralized regions of the cradles each preferably comprise an oblong aperture that may be defined as a Cassinian or Cassinoid type oval. The cradle mechanism or device according to the present invention further preferably comprises certain cradle-to-surface securing means for securing the cradle device to the surface.

The cradle-to-surface securing means are preferably attached or anchored to the surface and are cooperable with the oblong aperture for enabling a user to linearly and rotatably displace the centralized region. The cradle device or mechanism according to the present invention thus basically functions to secure the electronic device to the surface in a select linear and rotative position as determined by the user.

The cradle-to-surface securing means may be preferably exemplified by a disk assembly or anchor-cap assembly. The disk or anchor-cap assembly preferably comprises a surface-attachment disk or anchor structure, a cradle-engagement disk or cap assembly, and certain spacer-attachment means (as exemplified by male axle structure, female axle structure, and a riser structure) for attaching the surface attachment disk to the cradle-engagement disk in parallel relation to one another.

The oblong aperture and cradle-engagement disk preferably further comprise certain cooperable locking means for selectively locking the centralized region 15 in a select rotative position. The cooperable locking means may be preferably exemplified by comprising a series of peripherally spaced male and female structures such as projections and notches, which projections and notches extend radially inwardly. Preferably, the series of peripherally spaced male and female structures are located or spaced 90 rotational degrees from one another.

The cradle device or mechanism according to the present invention further preferably comprises certain means for receiving and removably holding an electronic device. In this regard, each of the cradles preferably comprises at least one device-engaging arm, which arm(s) extend away from the centralized region. A first cradle, for example, shows four arms that extend away from the centralized region in a generalized X-shape; and a second cradle shows two laterally opposed arm assemblies that extend away from the centralized region.

The cradle device or mechanism according to the present invention thus cooperates with a case or cover construction and with an electronic device as exemplified by a tablet computer mounted thereon. The electronic device may be rotated and secured in a desired position such as landscape or portrait positions relative to the surface. Other objects of the present invention, as well as particular features, elements, and advantages thereof, will be elucidated or become apparent from, the following description and the accompanying drawing figures.

BRIEF DESCRIPTION OF THE DRAWINGS

Other features and objectives of my invention will become more evident from a consideration of the following brief description of patent drawings:

FIG. 3 is a top perspective view of the first cradle construction according to the invention made the subject of these specifications as attached to a generic case construction via a cradle-to-surface anchor assembly, the first cradle construction being shown in a first extreme linear position.

FIG. 4 is a top perspective view of the first cradle construction according to the invention made the subject of these specifications as attached to a generic case construction via a cradle-to-surface anchor assembly, the first cradle construction being shown in a second extreme linear position.

FIG. 5 is a top perspective view of the first cradle construction according to the invention made the subject of these specifications as attached to a generic case construction via a cradle-to-surface anchor assembly, and retaining a generic electronic device in the first extreme linear position.

FIG. 6 is a top perspective view of the first cradle construction according to the invention made the subject of these specifications as attached to a generic case construction via a cradle-to-surface anchor assembly, and retaining a generic electronic device in the second extreme linear position.

FIG. 7A is an enlarged fragmentary anterior depiction of a generic centralized region of the cradle apparatus according to the present invention attached to a cradle-to-surface anchor assembly according to the present invention, the centralized region being shown in the first extreme linear position.

FIG. 7B is an enlarged fragmentary anterior depiction of a generic centralized region of the cradle apparatus according to the present invention attached to a cradle-to-surface anchor assembly according to the present invention, the centralized region being shown in the second extreme linear position.

FIG. 9 is an enlarged side view depiction of the cradle-to-surface anchor assembly according to the present invention shown attached to a fragmentary generic centralized region of the cradle apparatus according to the present invention.

FIG. 15 is a posterior elevational view of the first cradle construction according to the invention made the subject of these specifications as attached to the cradle-to-surface anchor assembly according to the present invention, the first cradle construction being shown in the first extreme linear position.

FIG. 16 is an edge view of the first cradle construction according to the invention made the subject of these specifications as attached to the cradle-to-surface anchor assembly according to the present invention.

FIG. 17 is an anterior elevational view of the first cradle construction according to the invention made the subject of these specifications as attached to the cradle-to-surface anchor assembly according to the present invention, the first cradle construction being shown in the first extreme linear position.

FIG. 20 is a first edge view of a hook construction from the first cradle construction according to the invention made the subject of these specifications.

FIG. 21 is a second edge view of a hook construction from the first cradle construction according to the invention made the subject of these specifications.

FIG. 22 is a first end view of a hook construction from the first cradle construction according to the invention made the subject of these specifications.

FIG. 23 is a second end view of a hook construction from the first cradle construction according to the invention made the subject of these specifications.

FIG. 28 is an enlarged exploded perspective view of the first cradle construction according to the invention made the subject of these specifications as exploded from the cradle-to-surface anchor assembly according to the present invention.

FIG. 29 is a front or anterior view of the cradle-engagement disk construction of the cradle-to-surface anchor assembly according to the present invention.

FIG. 30 is an edge view of the cradle-engagement disk construction of the cradle-to-surface anchor assembly according to the present invention.

FIG. 31 is a rear or posterior view of the cradle-engagement disk construction of the cradle-to-surface anchor assembly according to the present invention.

FIG. 32 is a front or anterior perspective view of the cradle-engagement disk construction of the cradle-to-surface anchor assembly according to the present invention.

FIG. 33 is a rear or posterior perspective view of the cradle-engagement disk construction of the cradle-to-surface anchor assembly according to the present invention.

FIG. 34 is a front or anterior view of the anchor disk construction of the cradle-to-surface anchor assembly according to the present invention.

FIG. 35 is an edge view of the anchor disk construction of the cradle-to-surface anchor assembly according to the present invention.

FIG. 36 is a rear or posterior view of the anchor disk construction of the cradle-to-surface anchor assembly according to the present invention.

FIG. 37 is a front or anterior perspective view of the anchor disk construction of the cradle-to-surface anchor assembly according to the present invention.

FIG. 38 is a rear or posterior perspective view of the anchor disk construction of the cradle-to-surface anchor assembly according to the present invention.

FIG. 39 is a front or anterior view of the cradle-to-surface anchor assembly according to the present invention.

FIG. 40 is an edge view of the cradle-to-surface anchor assembly according to the present invention.

FIG. 41 is a rear or posterior view of the cradle-to-surface anchor assembly according to the present invention.

FIG. 42 is a front or anterior perspective view of the cradle-to-surface anchor assembly according to the present invention.

FIG. 43 is a rear or posterior perspective view of the cradle-to-surface anchor assembly according to the present invention.

DETAILED DESCRIPTION OF THE PREFERRED EMBODIMENT

Figure 1:
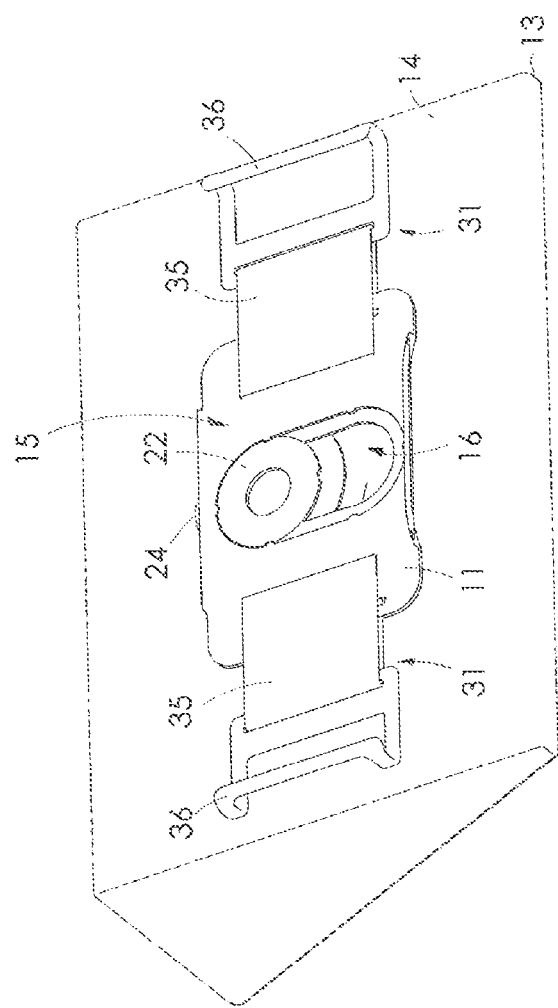
FIG. 1 is an enlarged top perspective view of a first cradle construction according to the invention made the subject of these specifications.

Referring now to the drawings with more specificity, the invention made the subject of these specifications preferably provides a cradle mechanism or device that is cooperable with a case or cover construction for both linearly displacing and rotatably displacing an electronic device that is cradled or received by the cradle mechanism.

In other words, the described invention contemplates a case or cover construction having a cradle mechanism cooperatively associated therewith. The case or cover construction is designed to encase an electronic device such as a tablet computer as received and cradled by the cradle mechanism. The cradle mechanism enables the user to rotate and linearly displace the cradled electronic device relative to certain surfacing of the case or cover construction.

Electronic devices such as tablet computers very often comprise features that require the user to position the electronic device, which features may be obscured by the case or cover construction in which they are housed. To overcome this perceived need in the art, the present invention provides a cradle mechanism that enables selective displacement of the target electronic device relative to certain surfacing of the case or cover construction so that users may make more effective use of the electronic device while protecting the electronic device with the case or cover construction that incorporates the cradle mechanism according to the present invention.

When received or cradled by the cradle mechanism according to the present invention, the electronic device may be rotated to achieve a different view of the screen, such as alternatively a portrait type orientation or a landscape orientation. The cradle mechanism and/or case or cover construction according to the present invention further enables the user to easily remove the electronic device from the cradle mechanism and/or case or cover construction in which it is housed when desired.

Some examples of the type of electronic device that may be used in combination with the present invention include any electronic device from the series of IPAD® brand tablet computers. IPAD® is a United States Registered Trademark of Apple Inc., a Corporation incorporated under the laws of the State of California, 1 Infinite Loop, Cupertino, Calif. 95014. The present invention further contemplates being used in combination with a MOTOROLA XOOM® brand tablet computer. MOTOROLA XOOM® is a United States Registered Trademark of Motorola Trademark Holdings, a Limited Liability Company incorporated under the laws of the State of Delaware, 600 N. U.S. Highway 45, Libertyville, Ill. 60048.

Further examples of the type of electronic device(s) usable in connection with the present invention include a KINDLE® brand e-book reader device. KINDLE® is a United States Registered Trademark of Amazon Technologies, Inc., a Corporation organized under the laws of the State of Nevada, P.O. Box 8102, Reno, Nev. 89507. The electronic device may also be a NOOK® brand e-book reader device. NOOK® is a United States Registered Trademark of Fission LLC, a Limited Liability Company organized under the laws of the State of Delaware, 122 Fifth Avenue, New York, N.Y. 10011.

The reader will thus note that the type of electronic device that may be used in combination with the present invention may be any hand-held computing device, media reader, tablet computer, or portable electronic device for receiving and reading text, images, or other audio visual media.

The cradle apparatus, mechanism or device according to the present invention basically provides a mechanism for simultaneously rotatably and linearly displacing an electronic device (as at 12) as cradled by the mechanism adjacent a select cradle-receiving surface as at 14 of a case or cover construction as generically depicted and referenced at 13. To achieve this primary function, the cradle mechanism or device according to the present invention preferably comprises a cradle construction as depicted at cradle 11, which cradle 11 is preferably sized and shaped to removably receive an electronic device 12 as generally depicted in FIGS. 2, 5, 6, and 19.

The cradle 11 preferably and generically comprises a substantially flat centralized region as at 15. The centralized region 15 of the cradle 11 preferably comprises an oblong aperture 16 that may be defined as a Cassinian or Cassinoid type oval. A Cassinian or Cassinoid oval or curve is basically an oblong aperture having two rounded, or semicircular opposite ends joined by parallel sides as generally depicted in the illustrations in support of these specifications.

Stated more mathematically, given two foci as at $F_1$ (e.g. 0, −1) and $F_2$ (e.g. 0, 1), one can distinguish two polar coordinates, with respect to each of the foci $F_1$ and $F_2$. The curve for which the product of these two polar radii is a constant is the Cassinian oval. The curve can be generalized to the Cassinian curve. For the curve, the product of distances to the two focal points is a constant. A Cassinian curve is a bicircular quartic and an anallagmatic curve. In polar coordinates, the curve is written as: $r^2=2\cos 2\theta+((a-1)/(r^2))$. The value of the variable named "a" determines the form of the Cassinian oval formed by the curve. For example, for "a">1, a single curve is defined; for "a"<1, two egg-shaped forms are defined.

For "a"<2, the Cassinoid oval or curve is squeezed in the middle, and for "a">2, the curve goes towards a circle. For "a"=2, or $r^2=2\cos 2\theta+((1)/(r^2))$, the curve approximates an oblong aperture comprising a longitudinal axis as at 100, a lateral axis as at 101, longitudinally opposed semicircular termini as at 102, and laterally opposed parallel sides as at 103, somewhat akin to a capsule-shaped pill. The oblong aperture 16 formed in the centralized region 15 according to the present invention approximates a Cassinoid oval where "a"=2. The longitudinal axis 101 of the oblong aperture 16 thus preferably comprises opposed semicircular foci as at $F_1$ and $F_2$, which foci $F_1$ and $F_2$ are joined by a line segment 17. Together, the foci $F_1$ and $F_2$ and line segment 17 define a cradle displacement zone segment along which the centralized region 15 may be both rotatably and linearly displaced.

Comparatively referencing FIGS. 7A and 7B, for example, the reader will note a first region position as depicted in FIG. 7A wherein the centralized region 15 has been displaced in a first direction as at 104 such that the disk assembly plane 105 extends through focus $F_1$. A second region position is depicted in FIG. 7B wherein the centralized region 15 has been displaced in a second direction as at 106 such that the disk assembly plane 105 extends through focus $F_2$.

Figure 13:
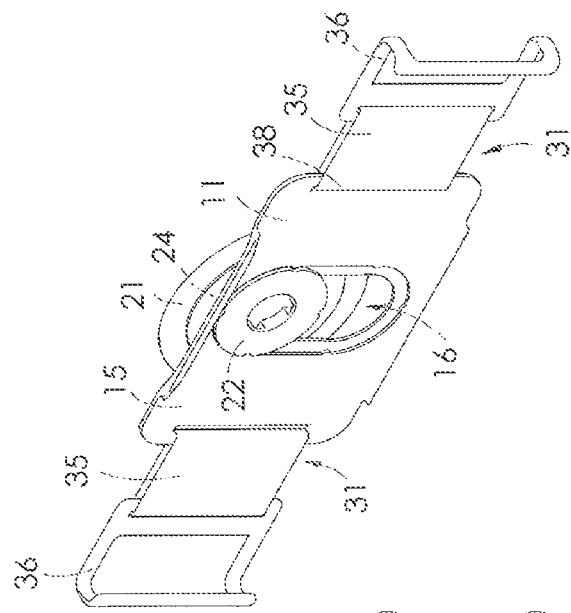
FIG. 13 is a top perspective view of the first cradle construction according to the invention made the subject of these specifications as attached to the cradle-to-surface anchor assembly in the second extreme linear position.
Figure 14:
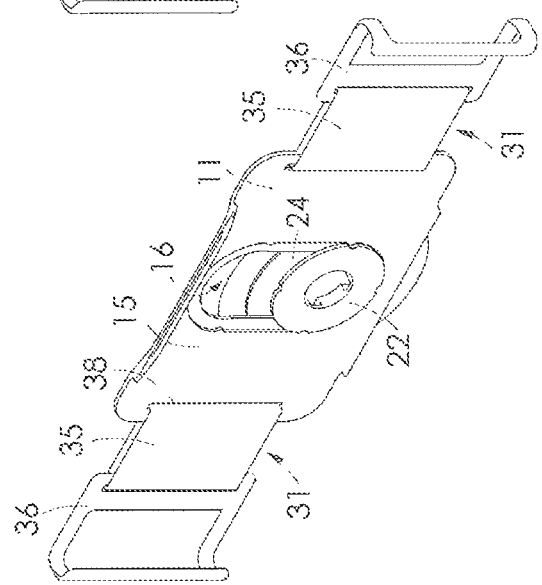
FIG. 14 is a top perspective view of the first cradle construction according to the invention made the subject of these specifications as attached to the cradle-to-surface anchor assembly in the first extreme linear position.
Figure 18:
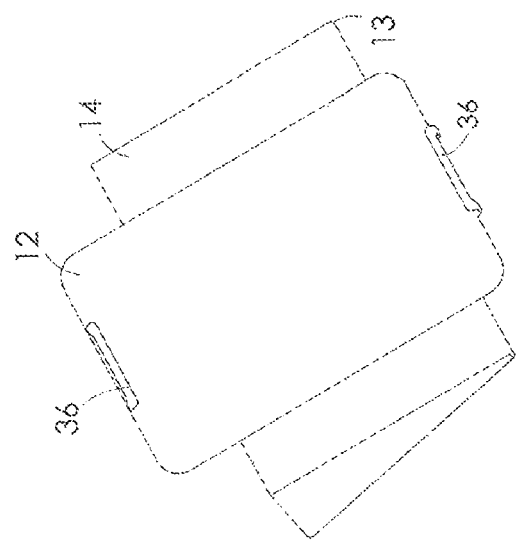
FIG. 18 is a top perspective view of the first cradle construction according to the invention made the subject of these specifications as attached to a generic case construction via a cradle-to-surface anchor assembly, the first cradle construction being shown rotated 90 degrees about an axis of rotation extending through the cradle-to-surface anchor assembly, the first cradle construction being rotated relative to the landscape orientation shown in FIG. 3 to depict a portrait orientation.

The first and second region positions shown in FIGS. 7A and 7B represent the two extreme linear displacement positions. The centralized region 15 is also rotatable about all points along the cradle displacement zone segment. Comparatively referencing FIG. 3 versus 4; and FIG. 13 versus 14, the reader will see the cradle 11 linearly displaced between the first and second extreme linear positions described hereinabove.

The cradle mechanism or device according to the present invention further preferably comprises certain cradle-to-surface securing means for securing the cradle device to the select surface as at 14. The cradle-to-surface securing means are preferably attached or anchored to the surface 14 and are cooperable with the oblong aperture 16 for enabling a user to linearly and rotatably displace the centralized region 15 along the cradle displacement zone segment. The cradle device or mechanism according to the present invention thus basically functions to secure the electronic device 12 to the select surface 14 in a select linear and rotative positions as determined by the user.

The cradle-to-surface securing means may be preferably exemplified by a disk assembly or anchor-cap assembly as at 20. The disk or anchor-cap assembly 20 preferably comprises a surface-attachment disk or anchor structure as at 21, a cradle-engagement disk or cap assembly as at 22, and certain spacer-attachment means (as exemplified by male axle structure 23A, female axle structure 23B, and a riser structure 24) for attaching the surface attachment disk 21 to the cradle-engagement disk 22 in parallel relation to one another.

Male axle structure 23A is insertable into female axle structure 23B to join the cap portion (cradle-engagement disk 22 and male axle structure 23A) of the assembly 20 to the anchor portion (anchor structure 21, riser structure 24, and female axle structure 23B) of the assembly 20. In a preferred embodiment the male and female axle structures 23A and 23B are irremovably attached to one another when the cradle 11 is attached to the surface 14 so that the cradle 11 is irremovable from the select surface 14 of the case or cover construction 13.

The reader will note that the cradle-engagement disk 22 preferably comprises a disk diameter as at 109, and the semicircular termini each comprise a uniform terminal diameter as at 111, which diameter 111 is substantially equivalent to the orthogonal distance between parallel sides 103. The disk diameter 109 is preferably lesser in magnitude than the terminal diameter(s) 111 for enabling linear and rotatable displacement of the centralized region 15 along the cradle displacement zone segment.

The oblong aperture 16 and cradle-engagement disk 21 preferably further comprise certain cooperable locking means for selectively locking the centralized region 15 in a select rotative position. The cooperable locking means may be preferably exemplified by comprising a series of peripherally spaced male and female structures such as tabs or projections 25 and notches 26, which projections 25 and notches 26 extend radially inwardly toward the foci $F_1$ and $F_2$ as generally depicted in the various figures. Preferably, the series of peripherally spaced male and female structures are located or spaced 90 rotational degrees from one another.

The centralized region 15 or oblong aperture 16 preferably further comprises a cradle-guide flange as at 27. The cradle-guide flange 27 extends inwardly intermediate the cradle-engagement disk 21 and the surface-attachment disk 22 in lateral adjacency to the spacer means as exemplified by the axle structures 23A and 23B for guiding the centralized region 15 when being displaced along the cradle displacement zone segment. Stated another way, the centralized region 15 preferably comprises a recessed material construction as at 27 that functions to displaceably receive the cradle-engagement disk 21 such that the cradle-engagement disk 21 is guided by the effective channel that the recessed material construction 27 provides.

The recessed material construction and/or flange 27 is preferably offset from the upper device-opposing surface 28 of the centralized region 15 so that the centralized region 15 and the cradle-engagement disk 21 are basically coplanar. In other words, the centralized region 15 preferably comprises a device-opposing surface as at 28, and the cradle-engagement disk 21 preferably comprises an upper disk surface as at 29. The cradle-guide flange or recessed material construction 27 is parallel to the device-opposing surface 28 and upper disk surface 29 for rendering flush (or coplanar) the device-opposing surface 28 and upper disk surface 29 as perhaps best seen in FIG. 9.

The cradle device or mechanism according to the present invention further preferably comprises certain means for receiving and removably holding an electronic device 12. In this regard, the cradle 11 preferably comprises at least one device-engaging arm or arm assembly, which arm structure(s) extend away from the centralized region 15. Cradle 11, for example, shows two laterally opposed arm assemblies as at 31 that laterally extend away from the centralized region 15.

In other words, the cradle 11 comprises laterally opposed arm assemblies 31 each of which preferably comprise an elastically deformable arm portion 34 and a hook construction 35, which hook construction 35 has been made the subject of U.S. Design patent application Ser. No. 29/464,386, filed in the U.S. Patent and Trademark Office on 15 Aug. 2013, now issued as U.S. Design patent No. D707,233.

The elastically deformable or adjustable arm portions 35 are preferably defined by elastic straps that enable the user to elastically deform the arm portions 35 of the arm assemblies 31 for receiving and removably retaining laterally opposed portions 37 of variously sized electronic device(s) 12 via the hook constructions 36. The arm portions 35 attach to the centralized region 50 of cradle 11 via strap-receiving apertures 38. The hook constructions 36 also comprise strap-receiving slots or apertures as at 39 for receiving an opposed end of the looped strap arm portions 35.

Figure 2:
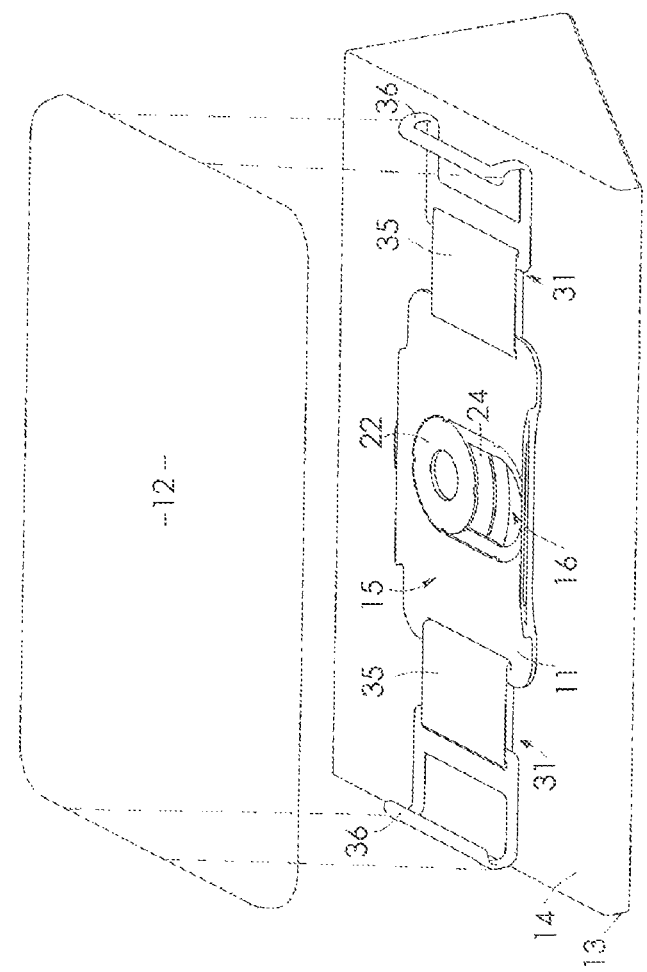
FIG. 2 is a top perspective view of the first cradle construction according to the invention made the subject of these specifications as attached to a generic case construction via a cradle-to-surface anchor assembly with a generic electronic device exploded therefrom.
Figure 8A:
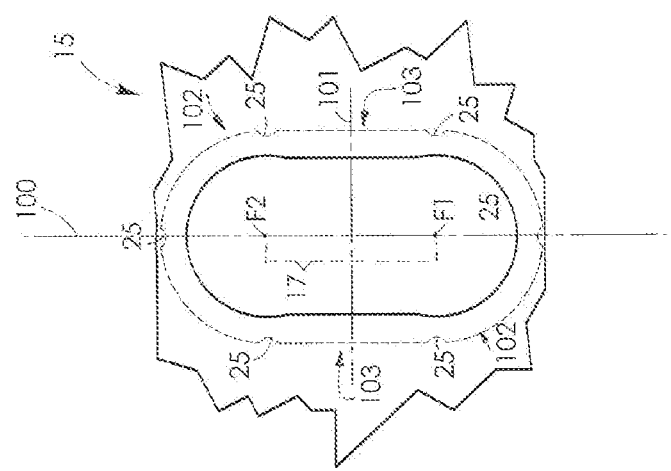
FIG. 8A is an enlarged fragmentary anterior depiction of a generic centralized region of the cradle apparatus according to the present invention.
Figure 8B:
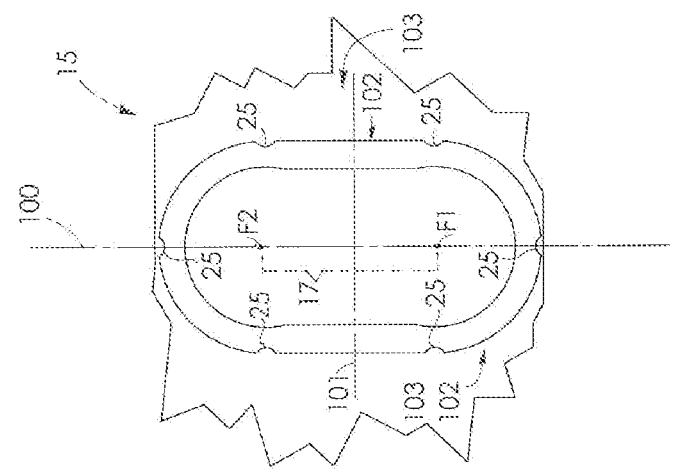
FIG. 8B is an enlarged fragmentary posterior depiction of a generic centralized region of the cradle apparatus according to the present invention.
Figure 10:
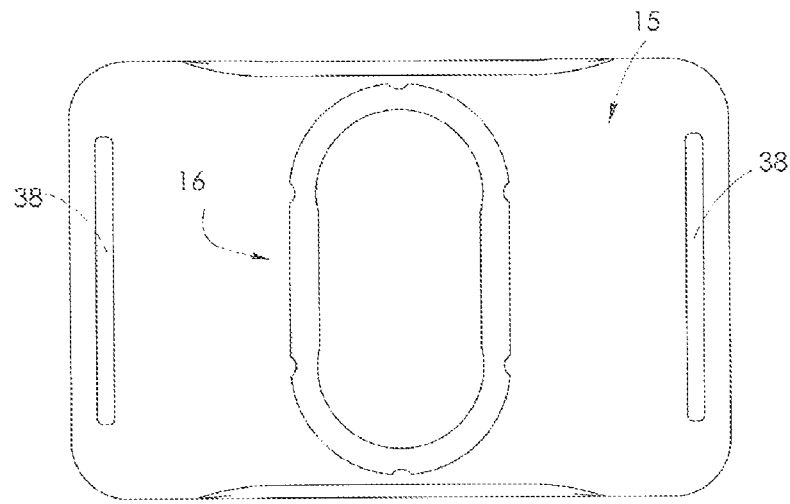
FIG. 10 is an anterior elevational view of the centralized region of the first cradle construction according to the invention made the subject of these specifications.
Figure 11:
FIG. 11 is an edge view of the centralized region of the first cradle construction according to the invention made the subject of these specifications.
Figure 12:
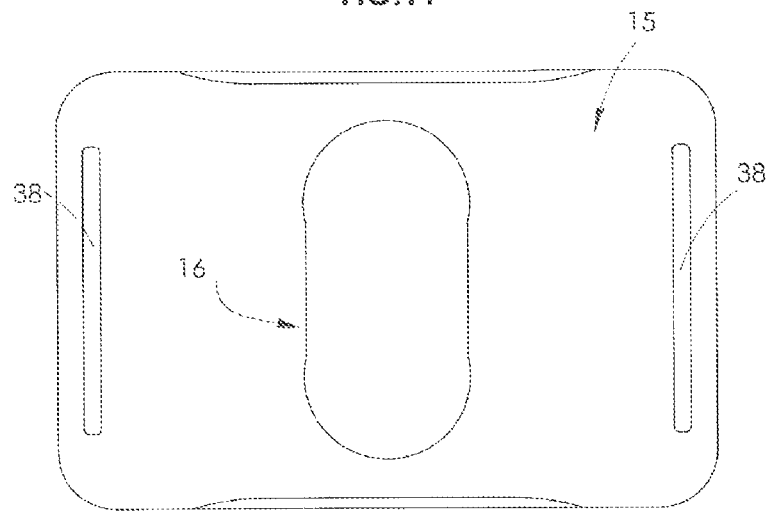
FIG. 12 is a posterior elevational view of the centralized region of the first cradle construction according to the invention made the subject of these specifications.
Figure 19:
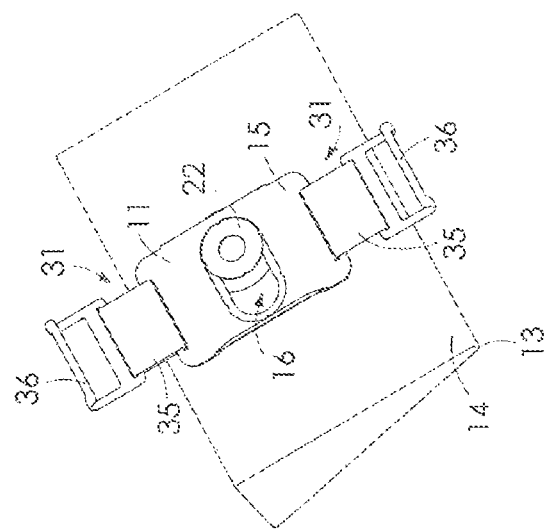
FIG. 19 is a top perspective view of the first cradle construction according to the invention made the subject of these specifications as attached to a generic case construction and retaining a generic electronic device in the portrait orientation.
Figure 24:
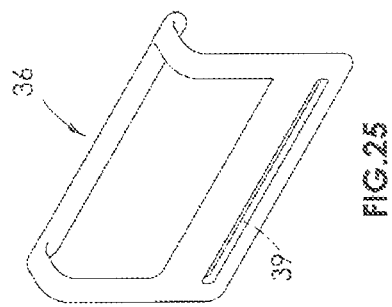
FIG. 24 is a first perspective view of a hook construction from the first cradle construction according to the invention made the subject of these specifications.
Figure 26:
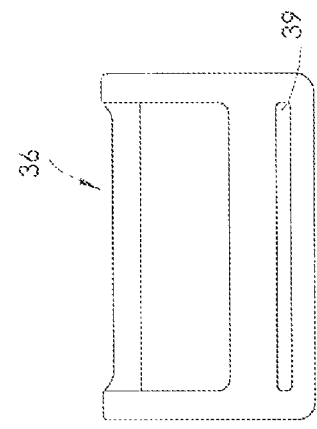
FIG. 26 is an anterior view of a hook construction from the first cradle construction according to the invention made the subject of these specifications.
Figure 25:
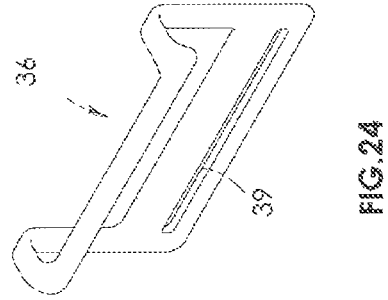
FIG. 25 is a second perspective view of a hook construction from the first cradle construction according to the invention made the subject of these specifications.
Figure 27:
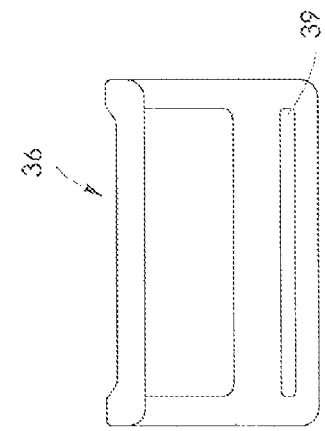
FIG. 27 is a posterior view of a hook construction from the first cradle construction according to the invention made the subject of these specifications.

The cradle device or mechanism according to the present invention thus cooperates with a case or cover construction as at 13 and with an electronic device 12 as exemplified by a tablet computer mounted thereon. The electronic device 12 may be rotated and secured in a desired position such as landscape position relative to the surface 14 as generally depicted in FIGS. 2, 5, and 6; or a portrait position relative to the surface 14 as generally depicted in FIG. 19. The cradle device or mechanism according to the present invention thus comprises in combination a cradle 11 with a cooperating disk or anchor-cap assembly as at 20.

The disk or anchor-cap assembly 20 is secured to the case or cover construction 13 in a suitable manner such as by stitched attachment, adhesive attachment, a hook and loop fastener type attachment, or any other suitable attachment mechanism or product. The cradle 11 receives an electronic device 12 and cooperates with the disk or anchor-cap assembly 20 to secure the electronic device 12 in a desired position.

Noting that the centralized region 15 preferably comprises locking tabs or protrusions 25 and the cradle-engagement disk 21 preferably comprises a series of notches 26, the electronic device 12, when received by the arm assemblies 31, may be rotated around the cradle-engagement disk 21 and the locking tabs or protrusions 25 may be aligned with the corresponding and select notches 26. When the desired rotatable position is achieved, the locking tabs 25 cooperate with notches 26 to selectively lock the cradle 11 in place.

The oblong aperture 16 may be viewed as a recessed material construction 27 within the cradle surface 28. The recessed aperture 16 allows the cradle-engagement disk 21 to be inserted within the aperture 16. Once mounted, the surface 29 of the cradle-engagement disk 21 is preferably even or flush with the cradle surface 28. Thus, the electronic device 12 or tablet computer may lay flat against the cradle 11 when removably received thereby.

While the above descriptions contain much specificity, this specificity should not be construed as limitations on the scope of the invention, but rather as an exemplification of the invention. For example, whenever possible, the same or similar reference numerals are used in the drawings and the specifications to refer to the same or like parts or steps. The drawings are in simplified form and are not to precise scale.

For purposes of convenience and clarity only, directional terms such as top, bottom, left, right, up, over, above, below, beneath, rear, and front, may be used with respect to the drawings. These and similar to directional terms are not to be construed to limit the scope of the invention in any manner. The words attach, connect, couple, and similar terms with their inflectional morphemes do not necessarily denote direct or intermediate connections, but may also include connections through mediate elements or devices.

The basic invention may be said to essentially teach or disclose a cradle device for attaching an electronic device to a select surface in a desired position. The cradle device according to the present invention is believed to essentially comprise a cradle sized and shaped to removably receive an electronic device, and certain cradle-to-surface securing means.

The cradle portion preferably comprises a flat centralized region, which centralized region comprises an oblong aperture. The oblong aperture comprises a longitudinal axis, a lateral axis, longitudinally opposed semi-circular termini, and laterally opposed parallel sides. The longitudinal axis comprises opposed semicircular foci, which foci are joined by a line segment. Together, the foci and line segment define a cradle displacement segment.

The cradle-to-surface securing means basically function to secure the cradle device to a select surface, as exemplified by a surface of a case or cover construction. The cradle-to-surface securing means are attached to the surface and are cooperable with the oblong aperture for enabling a user to linearly and rotatably displace the centralized region along the cradle displacement segment. The cradle device according to the present invention thus functions to secure the electronic device to the surface in a select linear and rotative position.

In addition to the foregoing structural considerations, it is further believed that the inventive concepts discussed support certain new methodologies and/or processes. In this regard, it is contemplated that the foregoing structural considerations support a method for displacing an electronic device relative to select surfacing so as to place the electronic device in a select orientation relative to the select surfacing.

The method may be said to preferably comprise the steps of anchoring an anchor-cap assembly to a select surface, which select surface may preferably be an inside surface of a device-holding case construction. A cradle construction may then be cooperatively associated with the anchor-cap assembly such that the anchor-cap assembly enables both to and fro linear displacements and rotatable displacements of the cradle construction relative to the select surface. The cradle construction basically functions as a device-to-surface interface such that when an electronic device is received and removably retained by the cradle construction, the electronic device may be displaced both linearly and rotatably relative to the select surface via the cradle construction and anchor-cap assembly.

Accordingly, although the invention has been described by reference to a number of embodiments and certain methodology, it is not intended that the novel device or cradle apparatus be limited thereby, but that modifications thereof are intended to be included as falling within the broad scope and spirit of the foregoing disclosure, the following claims, and the appended drawings.

I claim:

1. A case construction for encasing an electronic device and enabling a user to rotatably and linearly displace the electronic device relative to a select surface of the case construction, the case construction comprising, in combination:
   a case, the case comprising a cradle-receiving surface;
   a cradle sized and shaped to removably receive an electronic device, the cradle comprising a centralized region and at least one adjustable device-engaging arm extending away from the centralized region, the centralized region comprising an oblong aperture, the oblong aperture comprising a longitudinal axis, a lateral axis, longitudinally opposed termini, and laterally opposed parallel sides, the longitudinal axis comprising opposed foci, the foci being joined by a line segment, the foci and line segment together defining a cradle displacement zone segment; and
   cradle-to-surface securing means for securing the cradle to the cradle-receiving surface, the cradle-to-surface securing means being attached to the cradle-receiving surface and being cooperable with the oblong aperture for enabling a user to linearly and rotatably displace the centralized region along the cradle displacement zone segment, the cradle-to-surface securing means comprising a disk assembly, the disk assembly comprising a surface-attachment disk, a cradle-engagement disk, and spacer-attachment means for attaching the surface attachment disk to the cradle-engagement disk in parallel relation, the oblong aperture comprising a cradle-guide flange, the cradle-guide flange extending inwardly intermediate the cradle-engagement disk and the surface-attachment disk for guiding the centralized region when being displaced along the cradle displacement zone segment, the centralized region comprising a device-opposing surface, the cradle-engagement disk comprising an upper disk surface, the cradle-guide flange being parallel to the device-opposing and entire upper disk surfaces for rendering flush the device-opposing and entire upper disk surfaces, the oblong aperture and cradle-engagement disk comprising cooperable locking means for selectively locking the centralized region in a select rotative position, the cooperable locking means comprising a series of peripherally spaced male and female structures, the peripherally spaced male and female structures extending radially inwardly relative to a center of the cradle engagement disk when selectively locked, the at least one adjustable device-engaging arm being adjustable for engaging variously sized electronic devices.

2. The case construction of claim 1 wherein the at least one adjustable device-engaging arm is incorporated into laterally opposed arm assemblies extending away from the centralized region.

3. The case construction of claim 2 wherein each arm assembly comprises an elastically deformable arm portion and an end hook construction, the elastically deformable arm portions for enabling the user to elastically deform the arm portions of the arm assemblies for receiving and removably retaining opposed portions of variously sized electronic devices via the hook constructions.

4. The case construction of claim 3 wherein the elastically deformable arm portions link the hook constructions to the centralized region and via strap-receiving apertures formed in the centralized region and the hook constructions.

5. A cradle apparatus for attaching an electronic device to a select surface in a desired position, the cradle apparatus comprising:

a cradle sized and shaped to removably receive an electronic device, the cradle comprising a centralized region and at least one adjustable device-engaging arm extending away from the centralized region, the centralized region comprising an oblong aperture, the oblong aperture defining a cradle displacement zone segment; and cradle-to-surface securing means for securing the cradle apparatus to the select surface, the cradle-to-surface securing means being attached to the select surface and being cooperable with the oblong aperture for enabling a user to linearly and rotatably displace the centralized region along the cradle displacement zone segment, the cradle apparatus thus for securing the electronic device to the select surface in a select linear and rotative position, the cradle-to-surface securing means comprising an anchor-cap assembly, the anchor-cap assembly comprising a lower anchor structure, an upper cradle-engagement cap, and spacer-attachment means for attaching the lower anchor structure to the upper cradle-engagement cap in parallel relation to one another, the oblong aperture comprising a cradle-guide flange, the cradle-guide flange extending inwardly intermediate the cradle-engagement cap and the anchor structure for guiding the centralized region when being displaced along the cradle displacement zone segment, the centralized region comprising a device-opposing surface, the cradle-engagement cap comprising an upper cap surface, the cradle-guide flange being parallel to the device-opposing and entire upper cap surfaces for rendering flush the device-opposing and entire upper cap surfaces, the oblong aperture and cradle-to-surface securing means comprising cooperable locking means for selectively locking the centralized region in a select rotative position, the cooperable locking means comprising a series of peripherally spaced male and female structures, the peripherally spaced male and female structures extending radially inwardly relative to a center of the cradle-to-surface securing means when selectively locked, the at least one adjustable device-engaging arm being adjustable for engaging variously sized electronic devices.

6. The cradle apparatus of claim 5 wherein the at least one adjustable device-engaging arm is incorporated into laterally opposed arm assemblies extending away from the centralized region.

7. The cradle apparatus of claim 6 wherein each arm assembly comprises an elastically deformable arm portion and an end hook construction, the elastically deformable arm portions for enabling the user to elastically deform the arm portions of the arm assemblies for receiving and removably retaining opposed portions of variously sized electronic devices via the hook constructions.

8. The cradle apparatus of claim 7 wherein the elastically deformable arm portions link the hook constructions to the centralized region and via strap-receiving apertures formed in the centralized region and the hook constructions.

9. A method for displacing an electronic device relative to select surfacing so as to position the electronic device in a select orientation relative to the select surfacing, the method comprising the steps of:

providing an anchor-cap assembly, the anchor-cap assembly comprising a lower anchor structure, an upper cradle-engagement cap, and spacer-attachment means for attaching the lower anchor structure to the upper cradle-engagement cap in parallel relation to one another;

anchoring the anchor-cap assembly to a select surface;

cooperatively associating the anchor-cap assembly with a cradle construction, the cradle construction comprising a centralized region, at least one adjustable device-engaging arm extending away from the centralized region, and an oblong aperture, the oblong aperture comprising a cradle-guide flange, the cradle-guide flange extending inwardly intermediate the cradle-engagement cap and the anchor structure for guiding the cradle construction when being displaced, the centralized region comprising a device-opposing surface, the cradle-engagement cap comprising an upper cap surface, the cradle-guide flange being parallel to the device-opposing and entire upper cap surfaces for rendering flush the device-opposing and entire upper cap surfaces, the cooperatively associated anchor-cap assembly and cradle construction enabling both linear and rotatable displacements of the cradle construction relative to the select surface;

retaining an electronic device via the cradle construction, the electronic device thus being displaceable both linearly and rotatably relative to the select surface via the cradle construction and anchor-cap assembly;

selectively locking the cradle construction in a select rotative position relative to the select surface via selective locking means, the selective locking means comprising a series of peripherally spaced male and female structures, the peripherally spaced male and female structures extending radially inwardly relative to a center of the anchor-cap assembly when selectively locked; and adjusting the at least one adjustable device-engaging arm for engaging a selectively sized electronic device.

10. The method of claim 9 wherein the at least one adjustable device-engaging arm is incorporated into laterally opposed arm assemblies extending away from the centralized region.

11. The method of claim 10 wherein each arm assembly comprises an elastically deformable arm portion and an end hook construction, the elastically deformable arm portions for enabling the user to elastically deform the arm portions of the arm assemblies for receiving and removably retaining opposed portions of the selectively sized electronic device via the hook constructions.

12. The method of claim 11 wherein the elastically deformable arm portions link the hook constructions to the centralized region and via strap-receiving apertures formed in the centralized region and the hook constructions.

* * * * *